US010077651B2

(12) United States Patent
Lines

(10) Patent No.: US 10,077,651 B2
(45) Date of Patent: Sep. 18, 2018

(54) METHODS AND SYSTEMS FOR OPTICAL LINKS IN DOWNHOLE OIL WELL OPERATIONS

(71) Applicant: Halliburton Energy Services, Inc., Houston, TX (US)

(72) Inventor: Richard Lines, Pershore (GB)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 149 days.

(21) Appl. No.: 15/107,021

(22) PCT Filed: Sep. 9, 2015

(86) PCT No.: PCT/US2015/049188
§ 371 (c)(1),
(2) Date: Jun. 21, 2016

(87) PCT Pub. No.: WO2017/044094
PCT Pub. Date: Mar. 16, 2017

(65) Prior Publication Data
US 2017/0204725 A1    Jul. 20, 2017

(51) Int. Cl.
*E21B 47/12* (2012.01)
*E21B 17/02* (2006.01)
*E21B 21/08* (2006.01)
*G01V 8/20* (2006.01)

(52) U.S. Cl.
CPC .......... *E21B 47/123* (2013.01); *E21B 17/028* (2013.01); *E21B 21/08* (2013.01); *G01V 8/20* (2013.01)

(58) Field of Classification Search
CPC ..................................................... E21B 47/123
See application file for complete search history.

(56) References Cited

U.S. PATENT DOCUMENTS

| | | | |
|---|---|---|---|
| 4,566,317 A | * | 1/1986 | Shakra .................... E21B 47/10 73/152.35 |
| 4,857,735 A | | 8/1989 | Noller |
| 4,928,088 A | | 5/1990 | Jorion et al. |
| 5,272,350 A | | 12/1993 | Solari et al. |
| 7,002,142 B2 | | 2/2006 | Mullins et al. |

(Continued)

OTHER PUBLICATIONS

International Search Report and Written Opinion for PCT/US2015/049188 dated Feb. 16, 2016.

*Primary Examiner* — D. Andrews
*Assistant Examiner* — Kristyn A Hall
(74) *Attorney, Agent, or Firm* — McDermott Will & Emery LLP

(57) ABSTRACT

A system including a transmitter mounted inside a pressure bulkhead of a drill tool transmitting a light at a first wavelength is provided. The system includes a receiver mounted inside the pressure bulkhead to detect a second light at a second wavelength. The system also includes a wavelength multiplex unit positioned within the first pressure bulkhead for coupling the light at the first wavelength and the light at the second wavelength with an optical coupler. The optical coupler provides the light at the first wavelength to an external medium via a pressure resistant window and receives the light at the second wavelength from the external medium via the pressure resistant window. A method of using the above system to transmit and receive messages in a downhole optical link is also provided.

20 Claims, 10 Drawing Sheets

(56) References Cited

U.S. PATENT DOCUMENTS

| | | |
|---|---|---|
| 7,720,323 B2 | 5/2010 | Yamate et al. |
| 7,763,845 B2 | 7/2010 | Estes et al. |
| 7,782,460 B2 | 8/2010 | DiFoggio et al. |
| 7,981,845 B2 | 7/2011 | Samuel et al. |
| 8,536,516 B2 | 9/2013 | Ford et al. |
| 8,763,063 B2 | 6/2014 | Zhang et al. |
| 2006/0152383 A1 | 7/2006 | Yamate et al. |
| 2009/0097857 A1 | 4/2009 | Stoesz |
| 2009/0115623 A1 | 5/2009 | Macpherson et al. |
| 2010/0091288 A1 | 4/2010 | DiFoggio et al. |
| 2012/0112072 A1 | 5/2012 | Jones et al. |
| 2012/0211650 A1 | 8/2012 | Jones et al. |
| 2013/0342210 A1 | 12/2013 | Stokely |
| 2014/0111348 A1 | 4/2014 | Skinner et al. |

\* cited by examiner

METHODS AND SYSTEMS FOR OPTICAL LINKS IN DOWNHOLE OIL WELL OPERATIONS

BACKGROUND

In current downhole drilling operations, it is desirable to maintain data communication between the drill tool and a controller device at the surface, so that drilling parameters may be modified in real-time, as the drilling process progresses. This communication is commonly provided through the drill string, typically using electric or fiber-optic cables. Unfortunately, the relative rotation between the drill tool and other portions of the drill string (e.g., a tool string) makes it difficult to maintain a communication channel through the gap formed between the drill tool and the rest of the drill string.

Some attempts at forming a communication channel involve using electrically conductive brushes to make contact between the drill tool and the drill string, but have limited success due to the fast 'wear and tear' of the contacts, and the noise in the communication channel. Other attempts to establish a contact-less communication channels encounter the problem of finding adequate light sources and detectors that may work at the highly demanding environmental downhole conditions in the wellbore, such as high pressure, high temperature, and highly absorbing (opaque) materials.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

In the figures, elements having the same or similar reference numerals refer to the same or similar function, or step, unless otherwise noted.

DETAILED DESCRIPTION

Figure 1:
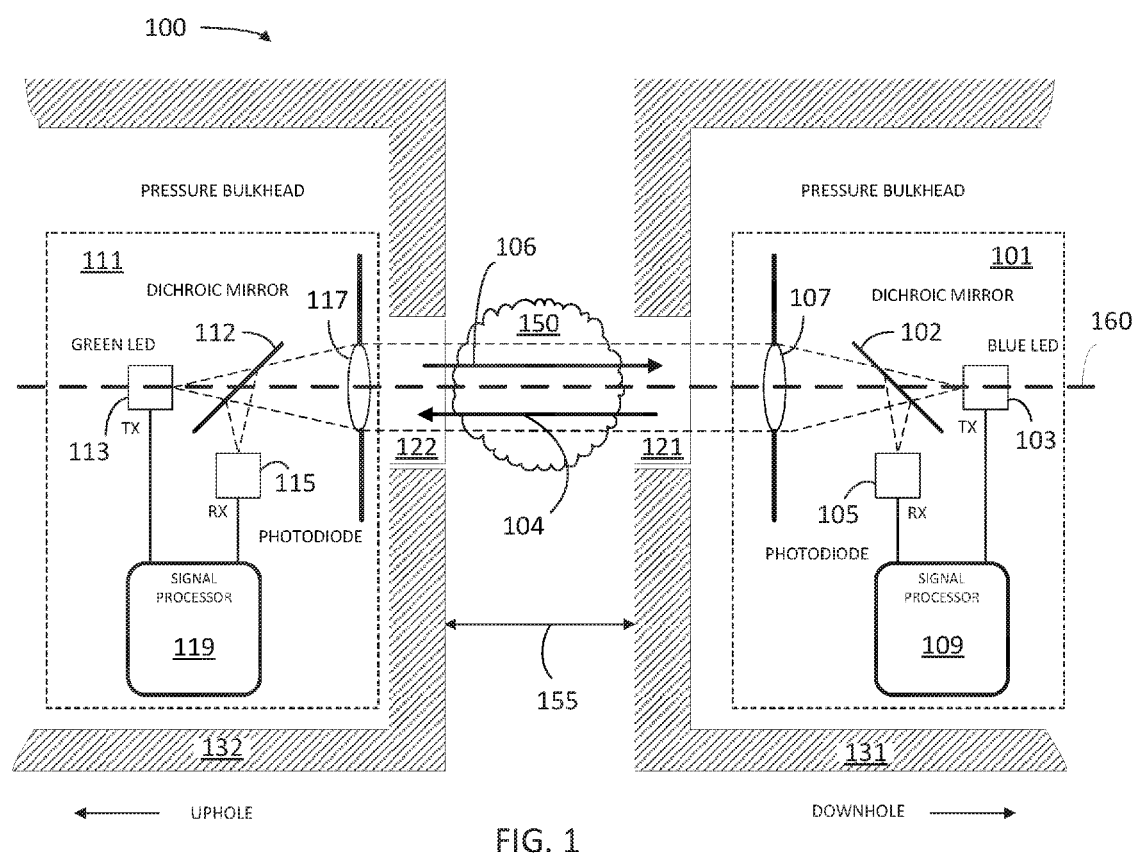
FIG. 1 illustrates a partial cross-sectional view of an optical link for use in downhole oil well operations.

The present disclosure relates to short distance downhole data communication between tools in a wellbore used in the oil exploration and extraction industry. More specifically, the present disclosure relates to devices and methods for providing a downhole optical data link to receive information from, and provide information to, a drill tool in a wellbore. In some embodiments, high power, rugged and energy efficient Light Emitting Diodes (LEDs) are included for downhole use as a short hop data link across the gap formed between a drill tool and the remaining portion of a drill string in the downhole. Moreover, some embodiments use the spectral characteristics of the electromagnetic radiation provided by the LEDs to measure a characteristic of a substance in the external medium filling the gap. In that regard, some embodiments may further use electromagnetic radiation emitted, absorbed, scattered, or otherwise optically interacted with a fluid surrounding the drill tool during data communication, to make a measurement of the characteristic of a sample.

As used herein, the term "characteristic" refers to a chemical, mechanical, or physical property of a substance. A characteristic of a substance may include a quantitative or qualitative value of one or more chemical constituents or compounds present therein or any physical property associated therewith. Such chemical constituents and compounds may be referred to herein as "analytes." Illustrative characteristics of a substance that can be monitored with the optical devices described herein can include, for example, chemical composition (e.g., identity and concentration in total or of individual components), phase presence (e.g., gas, oil, water, etc.), impurity content, ionic strength, total dissolved solids, salt content (e.g., salinity), porosity, opacity, bacterial content, combinations thereof, state of matter (solid, liquid, gas, emulsion, mixtures, etc.), and the like.

As used herein, the term "electromagnetic radiation" refers to radio waves, microwave radiation, infrared and near-infrared radiation, visible light, ultraviolet light, X-ray radiation and gamma ray radiation. In addition, emission and/or scattering of the fluid, for example via fluorescence, luminescence, Raman, Mie, and/or Raleigh scattering, can also be monitored by optical computing devices.

As used herein, the term "optically interact" or variations thereof refers to the reflection, transmission, scattering, diffraction, or absorption of electromagnetic radiation either on, through, or from a substance being analyzed by an optical device. Accordingly, optically interacted light refers to electromagnetic radiation that has been reflected, transmitted, scattered, diffracted, or absorbed by, emitted, or re-radiated, for example, using a processing element, but may also apply to interaction with a substance.

The features and advantages of the present disclosure will be readily apparent to those skilled in the art upon a reading of the description of the preferred embodiments that follows.

In a downhole oil well environment there is frequently the need to transmit data over short distances between drill collars of a drill string without the use of wires. Typically, this situation occurs where data is measured and collected at the drill tool attached at or near the end of the drill string but needs to be transferred higher up the drill string for further processing. A mud motor in the way along the drill string precludes the use of a mechanical or electrical connection.

Contact-less solutions are desirable where two adjacent drill collars rotate with respect to each other. Embodiments as disclosed herein use the latest LED technology as a transmission solution. Current LED technology is suitable for downhole use because of resilience with temperature and time.

In some embodiments, LEDs may be specified to 150° C. with short-term operation possible to even 175° C., or more, which makes them viable in many downhole situations. In some embodiments, LEDs emitting at shorter wavelengths are desirable due to their better temperature performance. Indeed, at shorter wavelengths the band gap of the semiconductor material forming the LED is larger and thus less affected by temperature (green to near ultraviolet; wavelength 520 nm to 400 nm).

In a first embodiment, a system includes a first transmitter that provides a first light at a first wavelength and a first receiver that detects a second light at a second wavelength. The system may also include a first wavelength multiplex unit coupling the first light and the second light with a first optical coupler. The first optical coupler provides the first light to an external medium and receives the second light from the external medium. In some embodiments, the first transmitter and the first receiver are mounted inside a pressure bulkhead of a drill tool for downhole oil well use. The pressure bulkhead may include a pressure resistant window.

In a second embodiment, a method includes transmitting a first signal from a first light at a first wavelength and receiving a second signal from a second light at a second wavelength. The method may further include rotating a first pressure bulkhead that houses a transmitter for the second signal relative to a second pressure bulkhead that houses a receiver for the second signal. The method may further include digitally decoding the second signal to retrieve a message and modifying a drilling parameter in a drilling system based on the message.

In a third embodiment, a system includes a first transmitter that provides a first light at a first wavelength and a first receiver that detects a second light at a second wavelength. The system may also include a first optical coupler that provides the first light to an external medium and receives the second light from the external medium, a second receiver that detects the first light, and a second transmitter that provides the second light. Further, the system may include a second optical coupler that provides the second light to the external medium and receives the first light from the external medium. In some embodiments, the first optical coupler has an optical axis aligned with an optical axis of the second optical coupler, and the first optical coupler rotates relative to the second optical coupler about its optical axis.

FIG. 1 illustrates a partial cross-sectional view of an exemplary optical link 100 for use in downhole oil well operations, according to one or more embodiments. As illustrated, optical link 100 includes a first transceiver 101 and a second transceiver 111. First transceiver 101 may include a first transmitter 103 that provides a first light 104 at a first wavelength. A first receiver 105 detects a second light 106 at a second wavelength. Optical link 100 also includes a first wavelength multiplex unit 102 coupling first light 104 and second light 106 with a first optical coupler 107. In some embodiments, wavelength multiplex unit 102 avoids local interference between first light 104 and second light 106. In some embodiments, wavelength multiplex unit 102 includes a dichroic mirror that separates 'transmit' and 'receive' light paths inside transceiver 101. Accordingly, a dichroic mirror in multiplex unit 102 may transmit first light 104 efficiently and reflect second light 106 efficiently. In some embodiments, wavelength multiplex unit 102 may further include a filter in front of at least one of a photodiode in receiver 105 or a light emitting diode (LED) in transmitter 103. In some embodiments, the photodiode in receiver 105 can be replaced by other sensors such as an avalanche photodiode (APD) or a photomultiplier to make the link more sensitive. In some embodiments, a filter in wavelength multiplex unit 102 may include a narrow-band, dielectric layer interference filter. In yet other embodiments wavelength multiplex unit 102 may be a beam splitter that separates first light 104 from second light 106.

Optical coupler 107 provides first light 104 to an external medium 150 and receives second light 106 from external medium 150. Optical coupler 107 may include any number of optical elements such as prisms, lenses, mirrors, beam-splitter, and other 'free-space' optical elements. Optical coupler 107 may also include fiber optic and other integrated components, such as waveguide devices. In some embodiments, optical coupler 107 may include a convex lens that collimates first light 104 into a parallel beam and focuses second light 106 down to a point on a photodiode in receiver 105. As illustrated, the first transceiver 101 may be mounted inside a pressure bulkhead 131, and pressure bulkhead 131 may include a pressure resistant window 121. External medium 150 may include drilling mud, or any other material that is transparent or at least partially transparent at the wavelengths of first light 104 and of second light 106. For example, external medium 150 may include materials found in a typical drilling system between the two bulkheads, for example lubricants or gas.

First transceiver 101 may further include a first signal processor 109. Signal processor 109 digitally encodes a first signal in first light 104 to convey a first message. For example, the first message may be directed to a second transceiver 111. Furthermore, signal processor 109 may decode a second signal from second light 106 received by first receiver 105 to retrieve a second message. The second message may be provided from second transceiver 111 to first transceiver 101.

In some embodiments, second transceiver 111 may be analogous to first transceiver 101. Accordingly, in some embodiments second transceiver 111 includes a second transmitter 113 to provide second light 106 at the second wavelength. A second receiver 115 detects first light 104 at the first wavelength. Thus, in some embodiments second transceiver 111 may differ from first transceiver 101 in that receivers 105 and 115 may be optimized for receiving different wavelengths of light. Likewise, first transmitter 103 may differ from second transmitter 113 in that the two may be optimized to emit light at different wavelengths. Second transceiver 111 may include a second signal processor 119 that may decode the first signal in first light 104 detected at second receiver 115, and may further encode the second signal in second light 106 detected at first receiver 105. First and second signal processors 109 and 119 may implement digital signaling schemes that maintain a substantially constant average optical power in first and second transmitters 103 and 113, and a substantially constant average power in first and second receivers 105 and 115 substantially constant. Accordingly, some embodiments may take advantage of the substantially constant optical power feature of optical link 100 to perform secondary operations that depend on constant beam intensity. In some embodiments, such secondary operations may include optical measurements, and more specifically, differential optical measurements.

In some embodiments, transmitters 103 and 113 may include a light emitting diode (LED). LEDs are desirable tools for an optical link 100 due in part to their good performance under high temperature conditions (up to and exceeding 150° C.), and also to the high brightness that these devices may achieve. Moreover, current LED fabrication techniques provide a wide range of colors and wavelengths that may be selected so as to obtain two emission spectra at desirable wavelength ranges.

Second transmitter 113 and second receiver 115 are mounted inside a pressure bulkhead 132 of a drill tool for downhole oil well use. Similar to the first pressure bulkhead 131, the second pressure bulkhead 132 may include a pressure resistant window 122. In some embodiments, the pressure bulkheads 131 and 132 are separated by a gap 155 filled by external medium 150. Pressure bulkheads 131 and 132 may be part of a drill string for a downhole oil well use. In that regard, optical link 100 may provide data communication between two collars in the drill string. Thus, pressure windows 121 and 122 may be placed at opposing ends of opposing drill collars in the drill string. Accordingly, in some embodiments, pressure bulkheads 131 and 132 are each a drill collar. In yet other embodiments, a mud motor placed in between pressure bulkhead 131 and pressure bulkhead 132 provides the rotational power to a drill tool in pressure bulkhead 131. Accordingly, embodiments as disclosed herein provide an optical path through the mud motor down the drilling axis. In some embodiments, the optical path is provided by an optical fiber and optical couplers at each end, thus allowing transmission through a rotating system.

Pressure windows 121 and 122 may be reinforced to withstand high-pressure downhole conditions (e.g., several thousands of pounds per square inch). In some embodiments, pressure windows 121 and 122 may include fused quartz, or fused silica. Pressure bulkhead 131, as mounted on the drill tool, may be configured to rotate relative to pressure bulkhead 132 about an axis 160. Accordingly, first transceiver 101 and second transceiver 111 may be mounted on pressure bulkheads 131 and 132 such that an optical axis in first optical coupler 107 is aligned with an optical axis in second coupler 117, and along axis 160. It should be understood that the designation of first transceiver 101 as the transceiver placed in pressure bulkhead 131 on the 'downhole' side of optical link 100 and of second transceiver 111 as the transceiver placed in pressure bulkhead 132 on the 'uphole' side of optical link 100 is purely arbitrary and not limiting.

Figure 2:
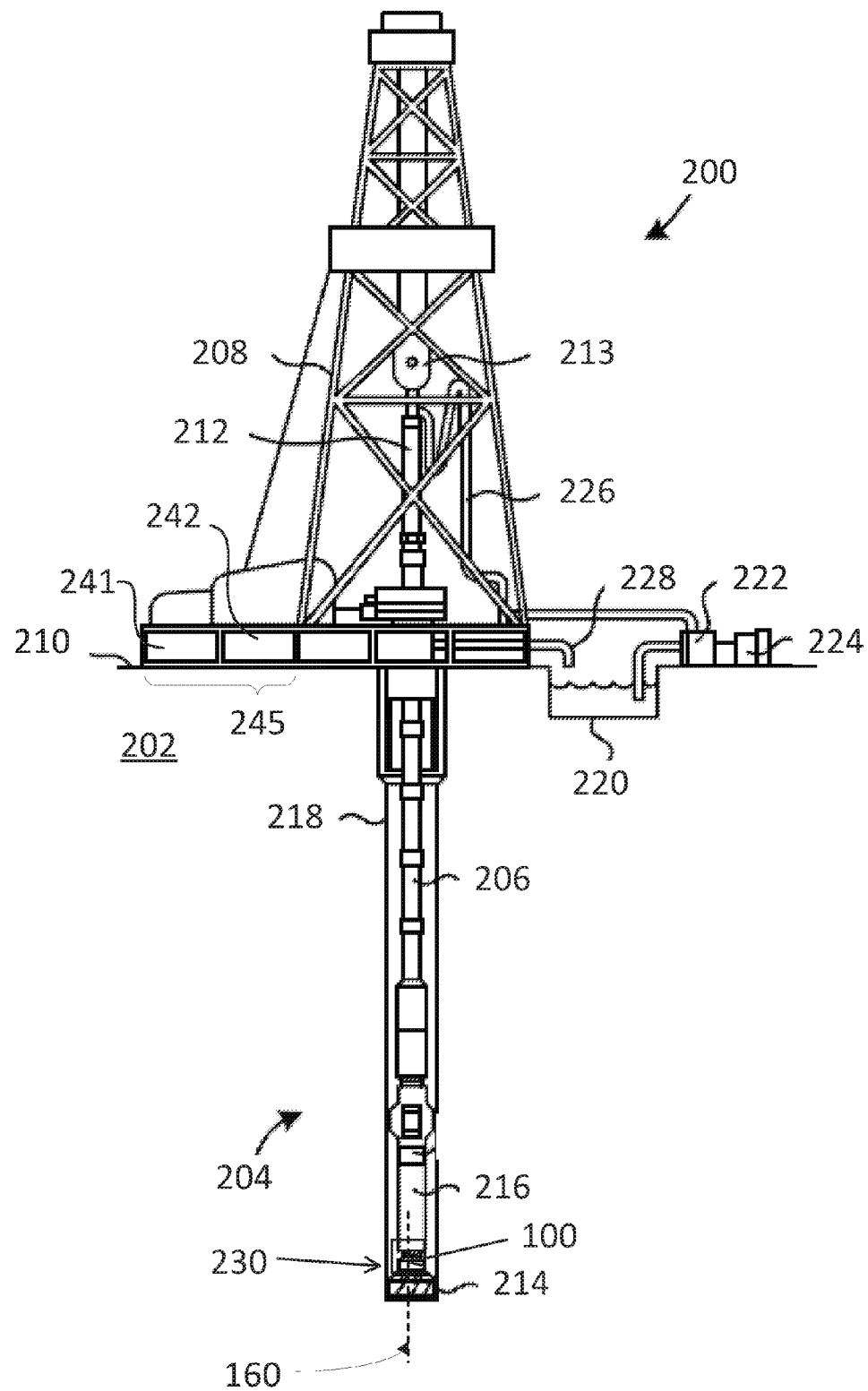
FIG. 2 illustrates a drilling system configured to use an optical link for downhole operations in a measurement-while-drilling (MWD) and a logging-while-drilling (LWD) operation.

FIG. 2 illustrates a drilling system 200 that may employ the optical link 100 of FIG. 1 for communicating drilling parameters or configurations in a measurement-while-drilling (MWD) and a logging-while-drilling (LWD) operation. Boreholes may be created by drilling into the earth 202 using the drilling system 200. Drilling system 200 may be configured to drive a bottom hole assembly (BHA) 204 positioned or otherwise arranged at the bottom of a drill string 206 extended into the earth 202 from a derrick 208 arranged at the surface 210. The derrick 208 includes a kelly 212 and a traveling block 213 used to lower and raise the kelly 212 and the drill string 206.

The BHA 204 may include a drill tool 214 operatively coupled to a tool string 216 which may be moved axially within a drilled wellbore 218 as attached to the tool string 216. During operation, drill tool 214 penetrates the earth 202 and thereby creates wellbore 218. BHA 204 provides directional control of drill tool 214 as it advances into earth 202. Tool string 216 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within drill string 216, as shown in FIG. 2.

Fluid or "drilling mud" from a mud tank 220 may be pumped downhole using a mud pump 222 powered by an adjacent power source, such as a prime mover or motor 224. The drilling mud may be pumped from mud tank 220, through a standpipe 226, which feeds the drilling mud into drill string 206 and conveys the same to drill tool 214. The drilling mud exits one or more nozzles arranged in drill tool 214 and in the process cools drill tool 214. After exiting drill tool 214, the mud circulates back to the surface 210 via the annulus defined between the wellbore 218 and the drill string 206, and in the process returns drill cuttings and debris to the surface. The cuttings and mud mixture are passed through a flow line 228 and are processed such that a cleaned mud is returned down hole through the standpipe 226 once again.

BHA 204 may further include a downhole tool 230 that may be similar to the downhole tools described herein. Accordingly, some embodiments include a mud motor and an optical link as disclosed herein. The downhole tool 230 may include a sensor that incorporates the use of the optical link 100. Downhole tool 230 may be positioned between drill string 216 and drill tool 214. More specifically, a first portion of optical link 100 may be at one end of drill string 216, and a second portion of optical link 100 may be at one end of drill tool 214. Accordingly, the second portion of optical link 100 may be stationary relative to drill tool 214, and rotate about the first portion of optical link 100 about axis 160. In some embodiments, axis 160 is aligned substantially along the drilling direction in drilling system 200. In some embodiments, optical link 100 transmits signals across a rotating mud motor within downhole tool 230. Accordingly, optical link 100 extends across or through downhole tool 230 such that first pressure bulkhead 131 forms part of drill tool 214 and second bulkhead 132 forms part of the end of tool string 216.

A controller 245 including a processor 241 and a memory 242 is communicatively coupled to optical link 100 in downhole tool 230. While optical link 100 may be placed only at the bottom of wellbore 218, and extend for a few inches, or a few feet, a communication channel may be established by complementing optical link 100 by using electrical signals or mud pulse telemetry for most of the length of tool string 216 from drill tool 214 to controller 245. Memory 242 includes commands which, when executed by processor 241 cause controller 245 to perform steps in methods consistent with the present disclosure. More specifically, controller 245 may provide commands to and receive data from optical link 100 during operation. For example, in some embodiments, controller 245 may receive information from optical link 100 about drilling conditions in wellbore 218 and controller 245 may provide a command to BHA 204 to modify certain drilling parameters. For example, controller 245 may provide a command to adjust or change the drilling direction of drill tool 214 based on a message contained in information provided by optical link 100. In that regard, the information provided by optical link 100 to controller 245 may include certain drilling conditions such as temperature of drill tool 214, vibration of the drill motion, or pressure and temperature of the subterranean environment. More generally, information provided by optical link 100 to controller 245 may include data in a differential optical measurement performed by optical link 100. Accordingly, controller 245 may use processor 241 to determine a characteristic of a substance in a medium surrounding drill tool 214.

Figure 3:
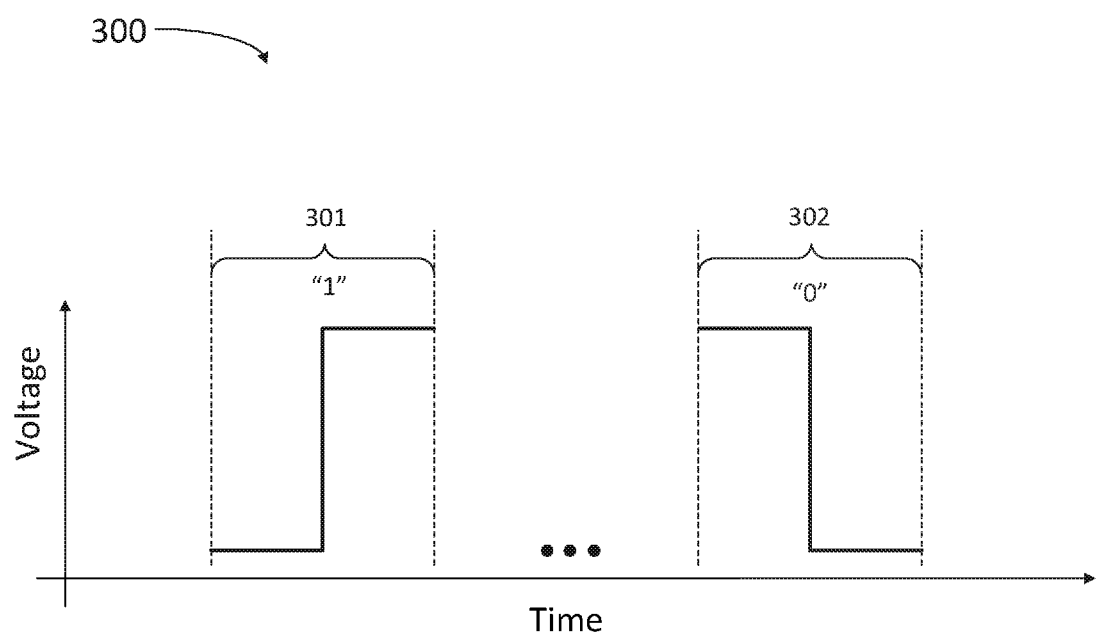
FIG. 3 illustrates a data stream in an optical link for use in downhole oil well operations.

FIG. 3 illustrates an exemplary data stream 300 in optical link 100 (FIGS. 1 and 2) for use in downhole oil well operations. Data stream 300 may include a voltage value (Y-axis) that is modulated over a period of time (X-axis). Data stream 300 includes bits 301 and 302. Without limitation, embodiments consistent with the present disclosure may designate bit 301 as a '1' in a binary code, and bit 302 as a '0' in the binary code. Bit 301 includes a rising edge of a square pulse, and more generally may include a signal that, over a pre-selected period of time, increases from a low voltage value to a high voltage value. Bit 302 includes a falling edge of a square pulse. More generally, bit 302 may include a signal that, over a pre-selected period of time, falls from a high voltage value to a low voltage value. In embodiments consistent with the present disclosure, a pre-selected period of time allocated to bit 301 may be the same as the period of time allocated to bit 302, or to any other bit transmitted through optical link 100. Moreover, according to some embodiments, bit 301 and bit 302 may include an equal amount of time with a 'low' voltage signal portion as with a 'high' voltage signal portion regardless of which portion precedes the other. Accordingly, for bits transmitted across optical link 100, the average voltage is approximately constant, and approximately equal to the average between the 'low' voltage value, and the 'high' voltage value.

Data stream 300 corresponds to a signaling scheme that may include a Manchester digital coding. More generally, other optical modulation schemes can be used to form data stream 300. Without limitation, embodiments using a Manchester modulation maintain the average optical power as the data pattern of the signals transmitted between transceiver 101 and transceiver 111 changes. Each data bit 301 and 302 consists of equal 'on' and 'off' time. Thus for any data pattern the time-averaged power is substantially half the fully on power.

Figure 4:
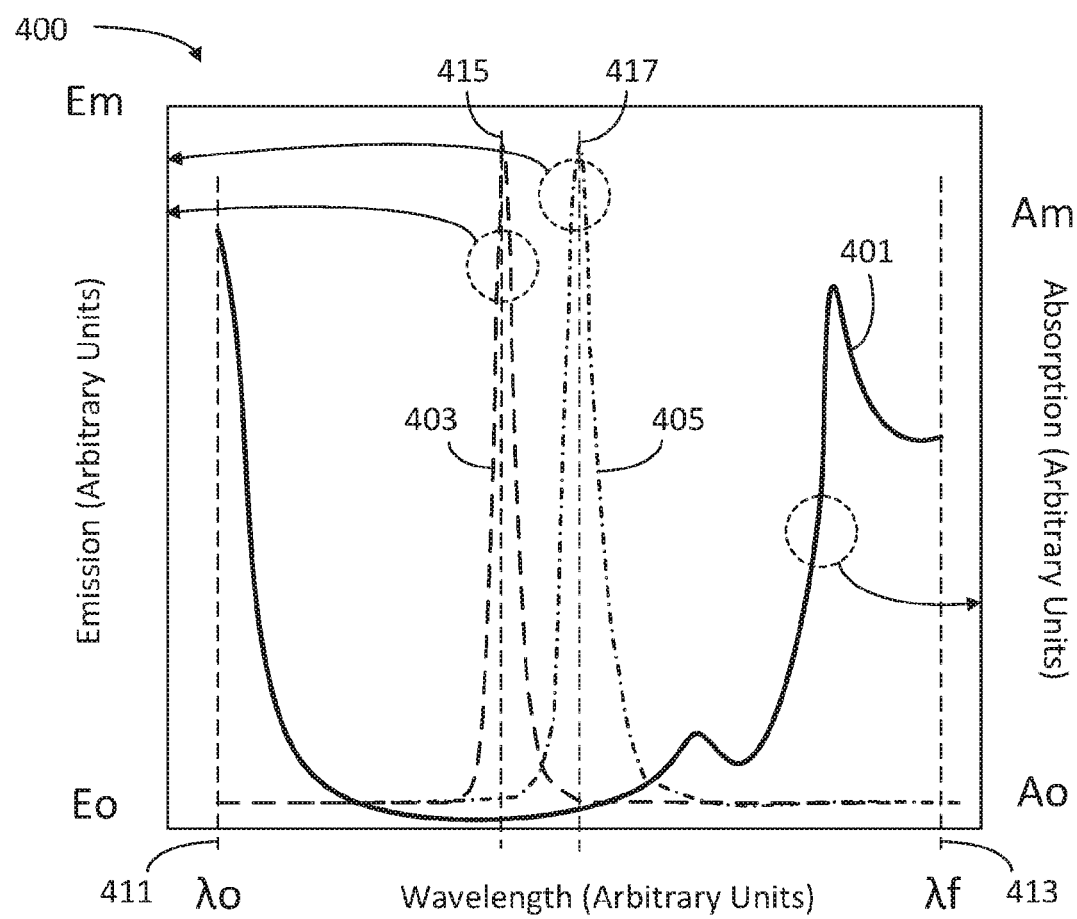
FIG. 4 illustrates a plot that depicts spectral characteristics of an optical link for use in downhole oil well operations.

FIG. 4 is a plot 400 that depicts spectral characteristics of optical link 100 for use in downhole oil well operations. The abscissa (X-axis) in plot 400 includes wavelength in arbitrary units. A first ordinate axis in plot 400 (to the left) includes an emission value, in arbitrary units (e.g., watts per unit of wavelength). A second ordinate axis in plot 400 (to the right) includes an absorption value (e.g., logarithm of input/output ratio per unit distance).

Trace 401 in plot 400 corresponds to water absorption in the spectral range from an initial wavelength (λo) 411 to a final wavelength (λf) 413. Accordingly, the ordinate axis corresponding to trace 401 is the absorption axis, to the right of plot 400. In some embodiments, λo may be in the lower end of the near-infrared (NIR) region (750 nm, to 800 nm) and λf may be in the higher end of the NIR region (2000 nm to 2500 nm). Other wavelength ranges within the scope of the present disclosure may include a UV-Visible range (λo~250 nm to λf~800 nm). Over the spectral span from λo to λf, trace 401 may include a minimum absorption value 'Ao', and a maximum absorption value 'Am'.

In some embodiments, trace 401 may be obtained using Beer's absorption law with a measurement of an absorption spectrum over a known length of the sample of interest (e.g., water for trace 401). Trace 401 illustrates that there is a strong dependence of a material absorption with respect to the wavelength of the electromagnetic radiation traversing a medium formed of the material. The absorption scale in plot 400 is exponential. For example, at a wavelength of close to λo the absorption is such that the light intensity falls to 10% of the incident intensity for a 1 meter thick water sample. For an absorption of 2 the intensity would fall to 1% ($1/10^{th}$ of the previous value).

Trace 403 is an emission spectrum of first light 104 from transmitter 103, centered at a first wavelength 415. Trace 405 is an emission spectrum of second light 106 from transmitter 105, centered at a second wavelength 417. The ordinate axis corresponding to traces 403 and 405 is the emission axis to the left of plot 400. In some embodiments, first wavelength 415 and second wavelength 417 are selected so that emission spectrum 403 and emission spectrum 405 have substantially non-overlapping portions in the spectral region from λo 411 to λf 413. In the spectral span from λo to λf, the emission of traces 403 and 405 may include a baseband emission 'Eo' and a peak emission 'Em'. The values of 'Eo' and 'Em' may be different for each of the two traces 403 and 405.

In some embodiments, receiver 105 in transceiver 101 has a different spectral response than receiver 115 in transceiver 111. For example, an unfiltered silicon detector responds best in the near infrared region (from about 800 nm to about 1100 nm), usually at approximately 900 nm. To avoid a potential loss of the first or second signal due to spectral mismatch in optical link 100, some embodiments may include a receiver 105 fabricated of a different material as compared to receiver 115. In some embodiments, while it is desirable for traces 403 and 405 to have a low overlap, it may also be desirable for the two wavelengths 415 and 417 to share a spectral region where: i) the sensitivity of a single detector material is high, so as to have similar receivers 105 and 115, and ii) the absorption spectrum of water is substantially lower than in other portions of the spectrum.

Some embodiments include a blue LED emitting at about 470 nm for transmitter 103, and a green LED emitting at about 525 nm for transmitter 113. The assignment of the blue LED to first transmitter 103 or to second transmitter 113 is not limiting of embodiments consistent with the present disclosure. Likewise, the green LED may be assigned for the first wavelength 415 and the blue LED may be assigned to the second wavelength 417 within the scope of the present disclosure.

In some embodiments, first wavelength 415 and second wavelength 417 are selected to perform a differential absorption measurement to determine a characteristic of a substance in a medium traversed by first light 104 and by second light 106. For example, first wavelength 415 may be selected so that a certain substance of interest in external medium 150 absorbs strongly at first wavelength 415. Moreover, second wavelength 417 may be selected so that the substance has minimal absorption at second wavelength 417. A differential absorption measurement may be performed by a mathematical operation as follows:

$$\text{Ratio} = \frac{I_{415} - I_{417}}{I_{415} + I_{417}} \quad (1)$$

Where $I_{415}$ is the light intensity at first wavelength 415 as measured by receiver 115, and $I_{417}$ is the light intensity at second wavelength 417 as received by receiver 105. Accordingly, the mathematical operations in Eq. (1) may be carried out by processor circuit 241 when controller 245 receives a signal including the value $I_{417}$ from transceiver 101. Further, transceiver 111 may provide a second signal including value $I_{415}$ to transceiver 101 through optical link 100, and from thereon to controller 245 through drill string 206.

In some embodiments, optical link 100 combines a digital communication between transceiver 101 and transceiver 111 with a two-band optical spectrometer for analysis of compounds in the external medium surrounding drill string 206 (e.g., drill mud).

Figure 5:
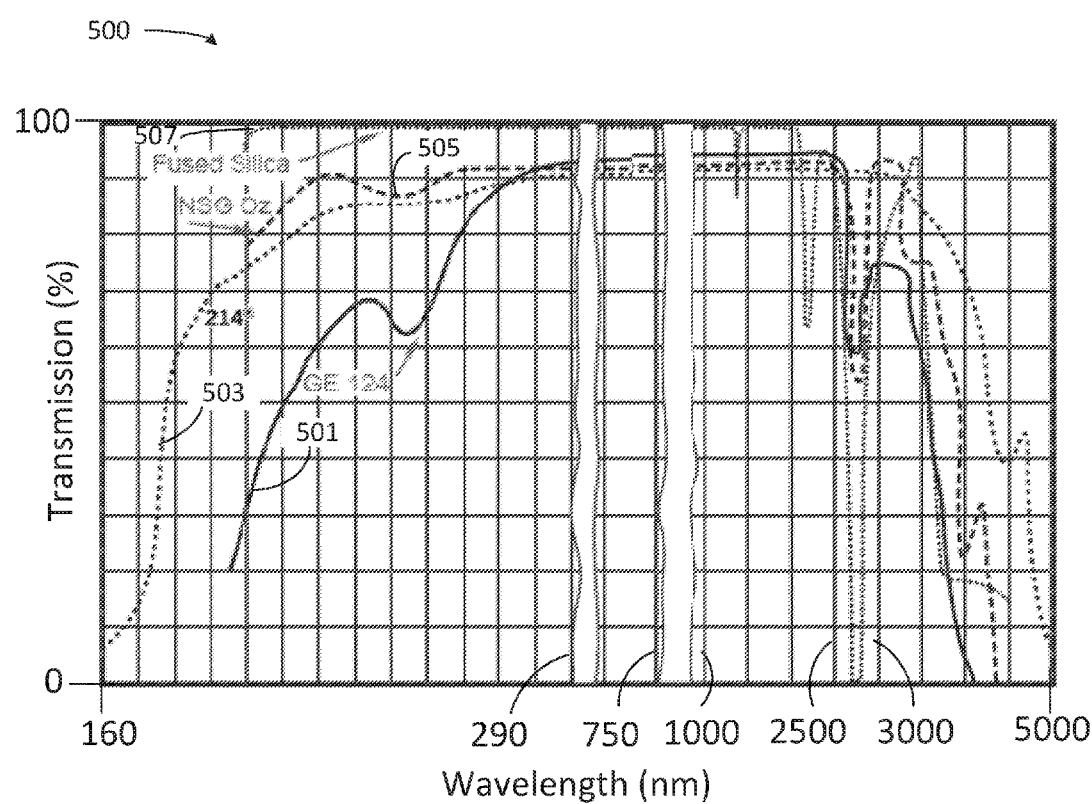
FIG. 5 illustrates a chart with spectral characteristics of window materials used in downhole oil well operations.

FIG. 5 is a plot 500 that depicts spectral characteristics of window materials that may be used for the high-pressure windows 121 and 122 of FIG. 1, according to one or more embodiments. Some of the materials that may be used in high-pressure windows 121 and 122 include a highly purified fused quartz glass (214®) 503 fused quartz glass (NSG Oz) 505, and fused silica 507. Other materials illustrated in FIG. 5 include germanium (Ge 501).

The two ends of optical link 100 include desirably transparent pressure rated windows 121 and 122: this is possible using fused quartz or fused silica 507. In choosing the specific material for high pressure windows 121 and 122 it is preferable to find a material with a high transmission over a spectral wavelength band including first wavelength 415 and second wavelength 417.

Figure 6A:
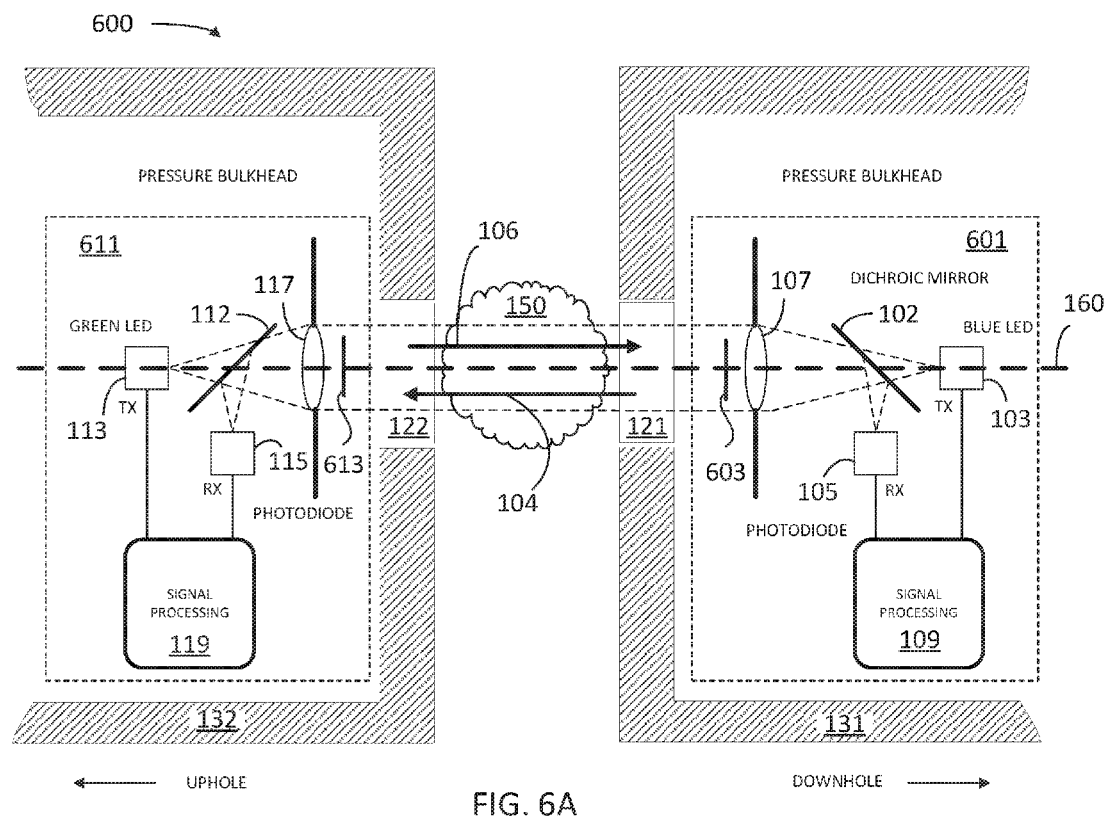
FIG. 6A illustrates a partial cross-sectional view of an optical link for use in downhole oil well operations including differential optical measurement data.

FIG. 6A illustrates a longitudinal cross-section of an optical link 600 for use in downhole oil well operations including differential optical measurement data. Optical link 600 may be similar in some respects to optical link 100 of FIG. 1 and therefore may be best understood with reference thereto, where like numeral represent like elements not described again in detail. As illustrated, optical link 600 includes first transceiver 601 and second transceiver 611. Elements and components in transceivers 601 and 611 having similar reference numbers as compared to transceivers 101 and 111 of FIG. 1 have the same characteristics and function. First transceiver 601 includes a first polarization element 603, and second transceiver 611 includes a second polarization element 613. In some embodiments, polarization elements 603 and 613 are linear polarizers having a polarization axis in a plane perpendicular to axis 160. Accordingly, as drill tool 214 rotates relative to drill string 206, pressure bulkhead 131 rotates about axis 160. In such configuration, the crossing of polarization elements 603 and 613 induces a modulation in signal intensity on both receivers 105 and 115. The modulation in signal intensity indicates a relative orientation between polarization elements 603 and 613. Accordingly, a rotation state and rotation speed (revolutions per minute) may be determined from the modulation in signal intensity. In some embodiments, external medium 150 in optical link 600 is clear, or physically homogenous, and thus the polarization state of first light 104 and second light 106 is preserved through external medium 150. In embodiments where the medium is turbid then polarization state of first light 104 and second light 106 will be diminished to a degree that indicates the level of turbidity of the medium. Accordingly, in some embodiments measuring a polarization degradation through optical link 600 may be used as a measure of turbidity. A turbid medium as disclosed herein may include a drilling mud or any other colloidal suspension of particles having a size comparable to or larger that the first wavelength and the second wavelength.

Polarization elements 603 and 613 may be integrated into optical couplers 107 and 117, respectively. For example, in some embodiments, at least one of polarization elements 603 and 613 may include a polarization preserving optical fiber and optical couplers 107 and 117 may include a collimating lens abutted to polarization elements 603 and 613. A polarization preserving optical fiber may support electromagnetic propagating modes linearly polarized in a selected orientation, thus acting as any one of polarization elements 603 or 613. Other polarization elements including integrated devices having waveguides may be included in polarization elements 603 and 613.

In some embodiments, the modulation in signal intensity induced by polarization elements 603 and 613 may indicate an alignment configuration between first and second pressure bulkheads 131 and 132. Accordingly, a slight misalignment in the rotation axis of first pressure bulkhead 131 in the plane of FIG. 6A (e.g., pitch or yaw about axis 160) may result in a detectable intensity modulation as polarization elements 603 and 613 rotate relative to one another. In some embodiments, it is desirable to avoid a loss of optical signal when polarization elements 603 and 613 cross each other to form an angle of about 90° between the polarization axes (e.g., when polarization elements 603 and 613 are linear polarizers). To maintain a signal over the entire rotation span of drill tool 214, some embodiments of optical link 600 cover only a portion of the optical beam formed by first light 104 and second light 106. This is illustrated in FIG. 6B, described in detail below.

Figure 6B:
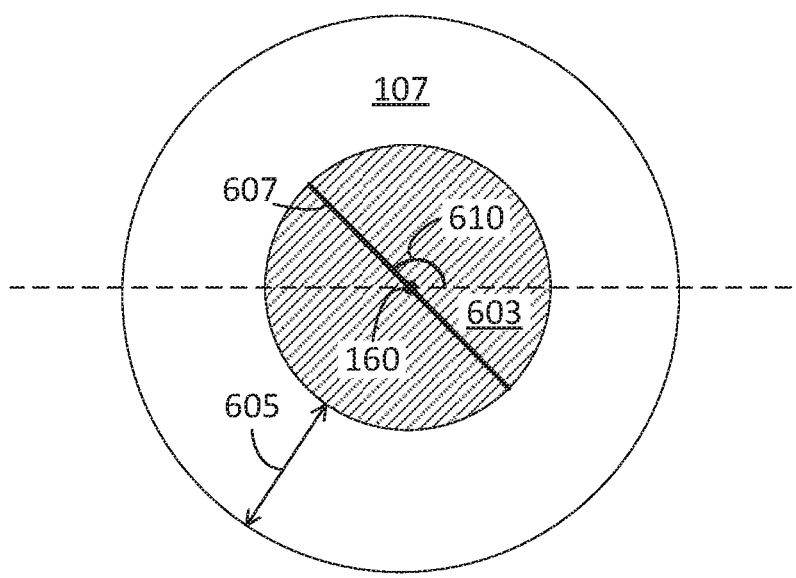
FIG. 6B illustrates a cross-sectional end view of an optical link for use in downhole oil well operations including differential optical measurement data.

FIG. 6B is a cross-sectional end view of optical link 600 taken at the first polarization element 603. Polarization element 603 (e.g., a linear polarizer) may provide a polarization axis 607. Polarization axis 607 may form an angle 610 in the azimuthal direction about axis 160. While not shown in FIG. 6B for clarity, embodiments as disclosed herein include a similar configuration for polarization element 613 relative to optical coupler 117. More specifically, some embodiments have polarization elements 603 and 613 with their centers aligned along axis 160, and with the optical axes of optical couplers 107 and 117.

A clear aperture 605 maintains a portion of first light 104 (and second light 106) provided by optical coupler 107 (and by optical coupler 117) in an un-polarized condition. This may be the case for LEDs in transmitters 103 or 113 having an un-polarized output. In some embodiments aperture 605 is about one-half of the diameter of optical coupler 107. Thus, a communication link between first transceiver 601 and second transceiver 611 is maintained throughout a full rotation of drill tool 214 about axis 160. The un-polarized portion of optical link 600 appears as a constant, direct current signal in the measured signal of receivers 105 and 115. The polarized portion of optical link 600 appears as a modulated, alternating current signal in the measured signal of receivers 105 and 115.

Figure 7:
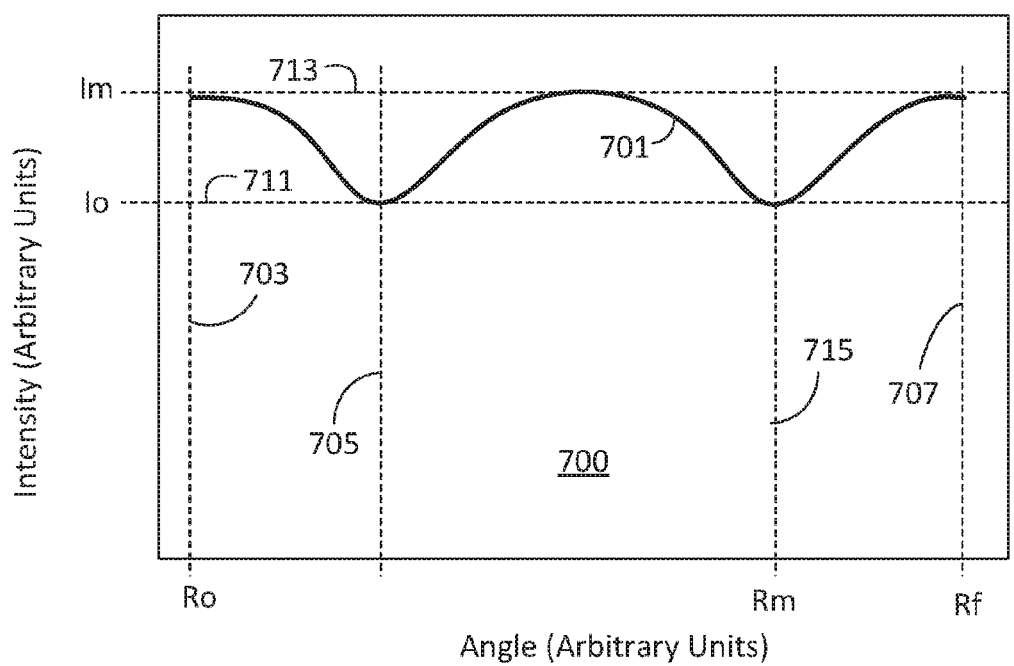
FIG. 7 is a plot that depicts differential optical measurement data.

FIG. 7 is a plot 700 that depicts differential optical measurement data. The abscissa (X-axis) in plot 700 represents rotation angle in arbitrary units, and the ordinate (Y-axis) represents signal intensity in arbitrary units. Plot 700 includes modulated signal 701. In some embodiments, each of the ordinate values in points included in modulated signal 701 may be a time-average of the voltage values in data stream 300 (cf. FIG. 3).

Modulated signal 701 shows the expected variation of intensity with angle, from a low value (Io) 711 to a high value (Im) 713 when the rotation angle changes from an initial position (Ro) 703 to a final position (Rf) 707. Without loss of generality, the angular displacement between Ro 703 and Rf 707 may be a full cycle (e.g., 360°, or $2\pi$ radians). Accordingly, modulated signal 701 indicates the angular configuration of drill string 206 and drill tool 214. Further, a similar result may be obtained when drill tool 214 rotates with respect to drill string 206 and the modulated signal 701 is plotted with time as the abscissa. In such case, the distance between troughs 705 and 715 may indicate the time it takes for the drill to complete a half-cycle of rotation (e.g., 180°, or π radians). According to some embodiments, troughs 705 and 715 are sharper than the peaks and are thus desirable candidates for precision angular measurements.

Figure 8:
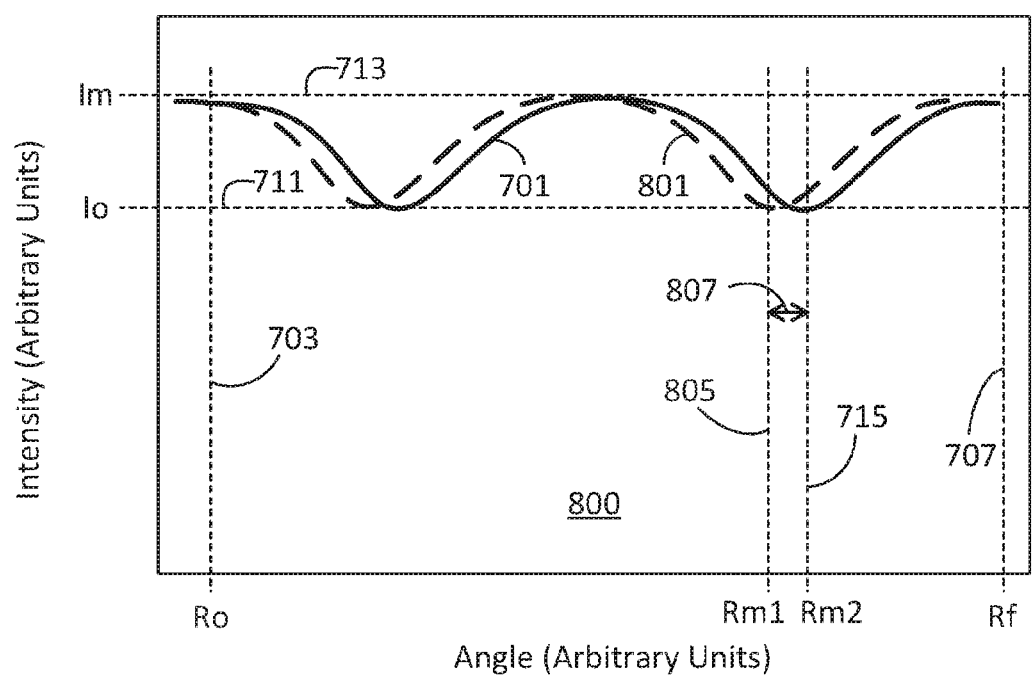
FIG. 8 is a plot that depicts differential optical data from a reference sample and from a sample including an optically active substance.

FIG. 8 is a plot 800 that depicts differential optical data from a reference sample and from a sample including an optically active substance. The ordinates and abscissa in plot 800 may similar to plot 700. Plot 800 illustrates modulated signal 701 from a reference sample having no optical activity, and modulated signal 801 from a sample including an optically active substance.

An optically active substance includes molecules having a definite mirror image symmetry. For example, the molecule may have a clockwise or counterclockwise threaded structure, which is inverted under a mirror image. Mirror image structures are chemically identical but they interact differently with polarized light. An asymmetric molecule in solution will rotate the plane of polarized light by an angle Θ proportional to the concentration 'c' of the asymmetric molecule in solution, and the optical path length 'l' of the light across the solution (e.g., the length of gap 155, cf. FIG. 1). Optically active chemicals may be present either in the formation fluids around a wellbore or mixed within the drilling mud (e.g., dyes and other markers). In a simple model, the angle Θ may be obtained from the following mathematical expression:

$$\Theta = kcl \quad (2)$$

Where k is a constant indicating the optical activity of the chemical concerned. Curves 701 and 801 in plot 800 provide an indication of the angle Θ simply by measuring a phase shift 807. Phase shift 807 in the modulation of the intensity of the second light from curve 701 to curve 801 indicates an amount of an optically active substance in the medium traversed by the second light. Accordingly, some embodiments include the value of phase shift 807 as the angle value Θ in Eq. (2) to obtain a value for the concentration 'c' of the optically active substance in external medium 150.

Thus, some embodiments use plane polarized light and a reference measurement for determining relative orientation to measure the concentration of optically active components in drilling mud, for example. Accordingly, the reference measurement may include a separate cross-polarization measurement using a reference substance that has no optical activity. In some embodiments, the reference cross-polarization measurement may include flushing gap 155 (FIG. 1) with water or any other reference substance and performing the cross-polarization measurement for at least one rotation cycle of drill tool 214 to obtain curve 701. In yet other embodiments, a reference cross-polarization measurement may be performed with the reference substance inside the first pressure bulkhead.

Some embodiments may include reference points such that a specific angle can be assigned to the troughs in reference curve 701 as the collars rotate with respect to each other. To this effect, some embodiments include a magnetic coupling or high side detection. The reference point could be set to coincide with one of the troughs in curve 701 (e.g., trough 715). Introducing an optically active chemical will then move trough 715 to the left or right along the rotation angle axis (e.g., to the left, trough 805, for retardation, cf. FIG. 8). When the collars are rotating, this corresponds to adding a phase delay 807 to the RPM signal in curve 701.

Optical activity is wavelength dependent. Accordingly, some embodiments may perform a differential polarization measurement as illustrated in FIG. 8 at two different wavelengths (e.g., wavelengths 415 and 417, cf. FIG. 4), which allows extra discrimination between chemicals.

Figure 9:
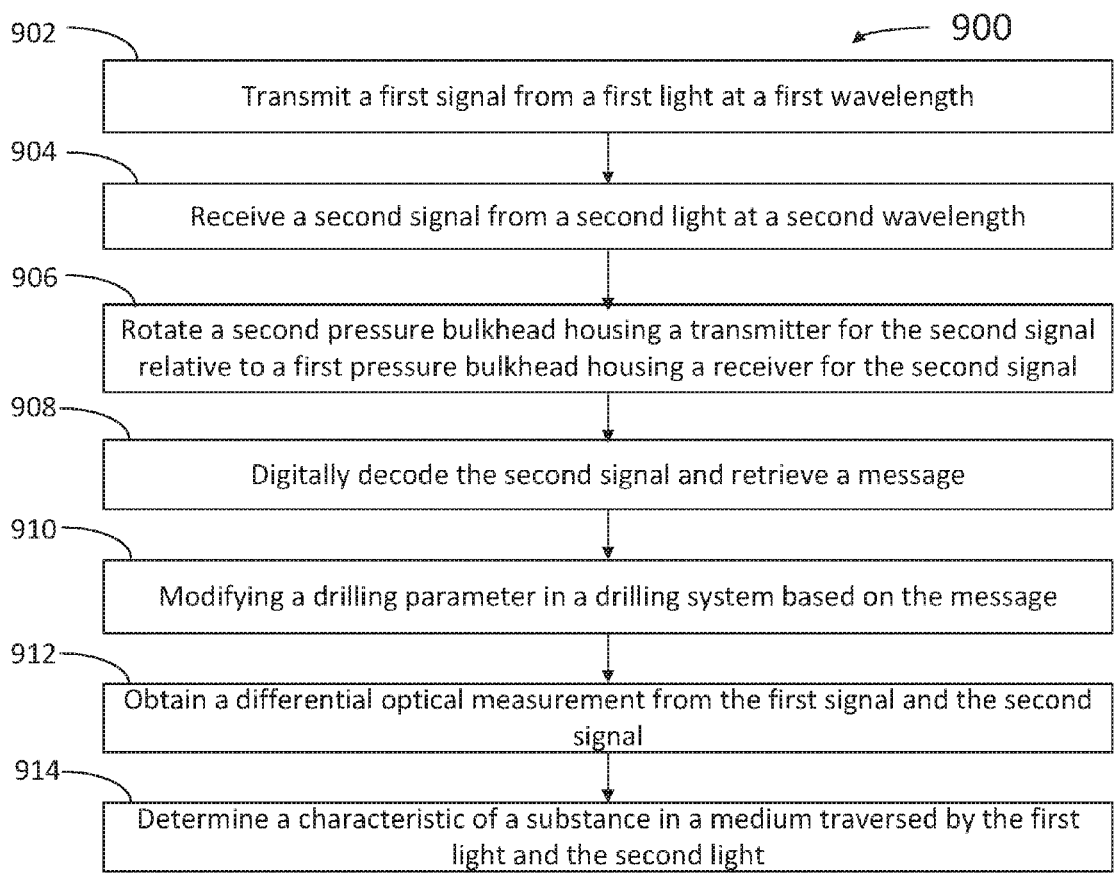
FIG. 9 illustrates a schematic flow chart including steps in a method for modifying a drilling parameter in a drilling system for oil well operations.

FIG. 9 illustrates a schematic flow chart including steps in a method 900 for modifying a drilling parameter in a drilling system for oil well operations. The drilling system used in the method 900 may be similar to the drilling system 200 of FIG. 2 and may include a drill string including a tool string, and a drill tool attached to the drill string (e.g., drill string 206, tool string 216, and drill tool 214, cf. FIG. 2). Moreover, the drilling system in methods consistent with method 900 may include a controller having a processor and a memory storing commands (e.g., controller 245, processor 241, and memory 242). Accordingly, in some embodiments the processor executing the commands stored in the memory may cause the controller to perform at least one or more of the steps in method 900.

Method 900 may include sending and retrieving messages in an optical link inside the wellbore (e.g., optical link 100 and wellbore 218, cf. FIG. 2). The optical link may include a first transceiver placed in one end of the drill string, and a second transceiver placed in one end of the drill tool (e.g., optical link 100, first transceiver 101, and second transceiver 111, cf. FIG. 1). The first transceiver and the second transceiver may be optically coupled, forming a gap filled by an external medium such as drilling mud (e.g., gap 155, and external medium 150, cf. FIG. 1). The gap allows the first transceiver to rotate with the drill tool about an axis while maintaining an optical coupling with the first transceiver (e.g., axis 160, cf. FIG. 1). Further, the first and second transceivers may include a first and second transmitter and a first and second receiver (e.g., transmitters 103 and 113, and receivers 105 and 115, cf. FIG. 1). In some embodiments, each pair of transmitter and receiver may be coupled to a signal processor that encodes and decodes digital signals to retrieve and provide messages (e.g., signal processors 109 and 119, cf. FIG. 1).

Step 902 includes transmitting a first signal from a first light at a first wavelength. In some embodiments, step 902 includes transmitting the first signal from a first transceiver including a first transmitter. Step 904 includes receiving a second signal from a second light at a second wavelength. In some embodiments, step 902 includes receiving the second signal at a first receiver in the first transceiver. Step 906 includes rotating a second pressure bulkhead housing a transmitter for the second signal relative to a second pressure bulkhead housing a receiver for the first signal. Accordingly, the transmitter for the second signal may be a second transmitter in the second transceiver.

Step 908 includes digitally decoding the second signal and retrieving a message. Accordingly, step 908 may include using the signal processor in the first transceiver for digitally encoding the second signal and retrieving the message. In some embodiments, step 908 may include reading a '1' when the second signal transitions from a low voltage to a high voltage during a predetermined period of time. Step 908 may also include reading a '0' when the second signal transitions from a high voltage to a low voltage during a predetermined period of time. Further, according to some embodiments, step 908 may include forming a binary string with the '0s' and '1s' read from the second signal. In some embodiments, step 908 may include digitally encoding the first signal to send a message using the signal processor in the first transceiver. According to some embodiments, the digitally encoding may include maintaining an approximately constant average power of the transmitted signal over a period of time that includes a plurality of bits. Moreover, in some embodiments step 908 may include digitally decoding the first signal and digitally encoding the second signal using the signal processor in the second transceiver.

Step 910 includes modifying a drilling parameter in a drilling system based on the message. Without limitation, step 910 may include adjusting a drilling direction in the drilling system when the message includes information regarding a hard substrate encountered by the drill. In some embodiments, step 910 may include adjusting a mud flow rate in the drilling system, when the message indicates a large amount of debris generated by the drill. In other embodiments, step 910 may include mixing an additive in the drilling mud when the message indicates a large concentration of a specific chemical in the drilling mud. For example, in some embodiments step 910 may include mixing an additive to increase or reduce the acidity or alkalinity of the drilling mud, according to the retrieved message. Further, in some embodiments step 910 may include mixing a dye or a marker substance in the drilling mud, where the dye or marker substance may be optically active. In yet other embodiments, step 910 may include modifying a drilling speed in the drill tool when the message indicates the rotational speed of the drill tool.

Step 912 includes obtaining a differential optical measurement from the first signal and the second signal. Step 912 may include obtaining a differential absorption measurement. Step 912 may also include obtaining a rotation measurement using a cross-polarization configuration. In some embodiments, step 912 may include obtaining a rotational speed of the drill tool from the rotation measurement.

Step 914 includes determining a characteristic of a substance in a medium traversed by the first light and the second light. Step 914 may include obtaining a substance concentration from the differential absorption measurement. Step 914 may further include measuring a concentration of an optically active substance using a phase shift in the cross-polarization measurement. In that regard, step 914 may also include performing a reference cross-polarization measurement with a reference substance, to provide a reference polarization curve and determine a phase shift to obtain the concentration of the optically active substance (e.g., curve 801, phase shift 807, cf. FIG. 8 and Eq. (1)).

Those skilled in the art will readily appreciate that the methods described herein, or large portions thereof, may be automated at some point such that a computerized system may be programmed to design, predict, and fabricate PhC-based ICEs with higher predictive power. Computer hardware used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments disclosed herein include:

A. A system that includes a first transmitter mounted inside a first pressure bulkhead of a drill tool, the first transmitter providing a first light at a first wavelength, a first receiver mounted inside the first pressure bulkhead to detect a second light at a second wavelength, and a first wavelength multiplex unit positioned within the first pressure bulkhead and coupling the first and second lights with a first optical coupler, wherein the first optical coupler provides the first light to an external medium via a first pressure resistant window and receives the second light from the external medium via the first pressure resistant window.

B. A method that includes transmitting a first signal from a first light at a first wavelength, the first signal being transmitted from a first transmitter mounted within a first bulkhead of a drill tool, receiving a second signal from a second light at a second wavelength, the second signal being transmitted from a second transmitter mounted within a second pressure bulkhead of a drill string and received at a first receiver mounted inside the first pressure bulkhead, rotating the first pressure bulkhead relative to a second pressure bulkhead, digitally decoding the second signal to retrieve a message, and modifying a drilling parameter in a drilling system that includes the drill tool and the drill string based on the message.

C. A system that includes a first transmitter mounted inside a first pressure bulkhead of a drill tool, the first transmitter providing a first light at a first wavelength, a first receiver mounted inside the first pressure bulkhead to detect a second light at a second wavelength, a first optical coupler positioned within the first pressure bulkhead, wherein the first optical coupler provides the first light to an external medium and receives the second light from the external medium, a second receiver mounted inside a second pressure bulkhead. The second receiver detects the first light from the external medium. The system also includes a second transmitter mounted inside the second pressure bulkhead, the second transmitter providing the second light, a second optical coupler positioned within the second pressure bulkhead. The first optical coupler has an optical axis aligned with an optical axis of the second optical coupler, and the first optical coupler rotates relative to the second optical coupler about its optical axis.

Each of embodiments A, B, and C may have one or more of the following additional elements in any combination: Element 1 a second transmitter mounted inside a second pressure bulkhead of a drill string and providing the second light at the second wavelength, and a second receiver mounted within the second pressure bulkhead to detect the first light, wherein the first and second pressure bulkheads are separated by a gap filled by the external medium. Element 2: a first signal processor that digitally encodes a first signal in the first light to convey a first message, and decodes a second signal from the second light received by the first receiver to retrieve a second message. Element 3: the first signal processor maintains an average optical power in the first transmitter and in the first receiver substantially constant. Element 4: the first transmitter includes a light emitting diode (LED), and the first and second wavelengths are selected so that the first light and the second light have substantially non-overlapping emission spectra. Element 5: the first wavelength and the second wavelength are selected in a spectral region with low water absorption. Element 6: the first wavelength and the second wavelength are selected to perform a differential absorption measurement to determine a characteristic of a substance in the external medium traversed by the first light and the second light. Element 7: a polarization element mounted in the first pressure bulkhead to modulate intensity of the second light as the drill tool rotates relative to a drill string. Element 8: a phase shift in the intensity of the second light indicates an amount of an optically active substance in the external medium traversed by the second light. Element 9: the polarization element modulates the intensity of the second light above a threshold intensity value.

Element 10: obtaining a differential optical measurement from the first signal and the second signal to determine a characteristic of a substance in a medium traversed by the first light and the second light. Element 11: determining a difference between an intensity associated with the first light and an intensity associated with the second light, and correlating the difference with a concentration of the substance. Element 12: at least partially polarizing the first light and the second light, and determining a phase shift in a modulation of the second signal received relative to the rotation between the first pressure bulkhead and the second pressure bulkhead. Element 13: shifting a direction of the drill tool in the first pressure bulkhead. Element 14: adjusting a flow rate of a drilling mud conveyed to the drill tool.

Element 15: the second pressure bulkhead is coupled to an end of a drill string for the downhole oil well use. Element 16: the first and second wavelengths are selected to perform a differential optical measurement of a substance in the external medium. Element 17: a first signal processing unit mounted inside the first pressure bulkhead, the first signal processing unit coupled to the first transmitter and the first receiver, and a second signal processing unit mounted inside the second pressure bulkhead, the second signal processing unit coupled to the second transmitter and the second receiver, wherein the second signal processing unit transmits a message encoded in the second light to the first signal processing unit. Element 18: the message includes information associated with a characteristic of the external medium.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A system, comprising:
a first transmitter mounted inside a first pressure bulkhead of a drill tool, the first transmitter providing a first light at a first wavelength;
a first receiver mounted inside the first pressure bulkhead to detect a second light at a second wavelength;
a first wavelength multiplex unit positioned within the first pressure bulkhead and coupling the first and second lights with a first optical coupler, wherein the first optical coupler provides the first light to an external medium via a first pressure resistant window and receives the second light from the external medium via the first pressure resistant window; and
a polarization element mounted in the first pressure bulkhead to modulate intensity of the second light as the drill tool rotates relative to a drill string.

2. The system of claim 1, further including:
a second transmitter mounted inside a second pressure bulkhead of a drill string and providing the second light at the second wavelength; and
a second receiver mounted within the second pressure bulkhead to detect the first light, wherein the first and second pressure bulkheads are separated by a gap filled by the external medium.

3. The system of claim 1, further including a first signal processor that digitally encodes a first signal in the first light to convey a first message, and decodes a second signal from the second light received by the first receiver to retrieve a second message.

4. The system of claim 3, wherein the first signal processor maintains an average optical power in the first transmitter and in the first receiver substantially constant.

5. The system of claim 1, wherein the first transmitter includes a light emitting diode (LED), and the first and second wavelengths are selected so that the first light and the second light have substantially non-overlapping emission spectra.

6. The system of claim 1, wherein the first wavelength and the second wavelength are selected in a spectral region with low water absorption.

7. The system of claim 1, wherein the first wavelength and the second wavelength are selected to perform a differential absorption measurement to determine a characteristic of a substance in the external medium traversed by the first light and the second light.

8. The system of claim 1, wherein a phase shift in the intensity of the second light indicates an amount of an optically active substance in the external medium traversed by the second light.

9. The system of claim 1, wherein the polarization element modulates the intensity of the second light above a threshold intensity value.

10. A method, comprising:
transmitting a first signal from a first light at a first wavelength, the first signal being transmitted from a first transmitter mounted within a first bulkhead of a drill tool;
receiving a second signal from a second light at a second wavelength, the second signal being transmitted from a second transmitter mounted within a second pressure bulkhead of a drill string and received at a first receiver mounted inside the first pressure bulkhead;
rotating the first pressure bulkhead relative to a second pressure bulkhead;
digitally decoding the second signal to retrieve a message; and
modifying a drilling parameter in a drilling system that includes the drill tool and the drill string based on the message.

11. The method of claim 10, further including obtaining a differential optical measurement from the first signal and the second signal to determine a characteristic of a substance in a medium traversed by the first light and the second light.

12. The method of claim 11, wherein obtaining the differential optical measurement includes determining a difference between an intensity associated with the first light and an intensity associated with the second light, and correlating the difference with a concentration of the substance.

13. The method of claim 11, wherein obtaining the differential optical measurement includes at least partially polarizing the first light and the second light, and determining a phase shift in a modulation of the second signal received relative to the rotation between the first pressure bulkhead and the second pressure bulkhead.

14. The method of claim 10, wherein modifying a drilling parameter in a drilling system includes shifting a direction of the drill tool in the first pressure bulkhead.

15. The method of claim 10, wherein modifying a drilling parameter in a drilling system includes adjusting a flow rate of a drilling mud conveyed to the drill tool.

16. A system, comprising:
a first transmitter mounted inside a first pressure bulkhead of a drill tool, the first transmitter configured to provide a first light at a first wavelength;
a first receiver mounted inside the first pressure bulkhead to detect a second light at a second wavelength;
a first optical coupler positioned within the first pressure bulkhead, wherein the first optical coupler is configured to provide the first light to an external medium and to receive the second light from the external medium;
a second receiver mounted inside a second pressure bulkhead, wherein the second receiver is configured to detect the first light from the external medium;
a second transmitter mounted inside the second pressure bulkhead, the second transmitter configured to provide the second light; and
a second optical coupler positioned within the second pressure bulkhead, wherein
the first optical coupler has an optical axis aligned with an optical axis of the second optical coupler; and
the first optical coupler is rotatable relative to the second optical coupler about its optical axis.

17. The system of claim 16, wherein the second pressure bulkhead is coupled to an end of a drill string for the downhole oil well use.

18. The system of claim 16, wherein the first and second wavelengths are arranged for a differential optical measurement of a substance in the external medium.

19. The system of claim 16, further including:
a first signal processing unit mounted inside the first pressure bulkhead, the first signal processing unit coupled to the first transmitter and the first receiver; and
a second signal processing unit mounted inside the second pressure bulkhead, the second signal processing unit coupled to the second transmitter and the second receiver, wherein
the second signal processing unit is configured to transmit a message encoded in the second light to the first signal processing unit.

20. The system of claim 19, wherein the message includes information associated with a characteristic of the external medium.

* * * * *